United States Patent

[11] 3,554,199

[72] Inventor Michel Auphan
 d'Orleans-Neuilly, France
[21] Appl. No. 742,880
[22] Filed July 5, 1968
[45] Patented Jan. 12, 1971
[73] Assignee U.S. Philips Corporation
 New York, N.Y.
 a corporation of Delaware by mesne
 assignments
[32] Priority July 24, 1967
[33] France
[31] No. 115.358

[54] HEART STIMULATING DEVICE
 7 Claims, 5 Drawing Figs.
[52] U.S. Cl. .................................................... 128/421
[51] Int. Cl. .................................................... A61n 1/36
[50] Field of Search ........................................ 128/419
 P(digest), 421—424; 310/(Inquired)

[56] References Cited
 UNITED STATES PATENTS
1,454,528 5/1923 Wiemann .................... 128/421X
2,995,132 8/1961 Browner ...................... 128/424X
 FOREIGN PATENTS
1,460,772 10/1966 France ......................... 128/419P
 OTHER REFERENCES
 Myers et al " American Journal of Medical Electronics"
Oct.-Dec., 1964 pp. 233— 236 (copy in 128/419P)

Primary Examiner—William E. Kamm
Attorney—Frank R. Trifari

ABSTRACT: A device for stimulating the action of the heart is implanted and supplies electric pulses to the heart muscle. The device includes a balance activated by heart movement which oscillates a rotor of an alternating-current generator. Rotation of the rotor within the generator's magnetic field provides electric pulses communicated to the heart for stimulating its action.

INVENTOR.
MICHEL AUPHAN

BY

*Frank R. Trifari*

AGENT

HEART STIMULATING DEVICE

This invention relates to an improvement in or a modification of the invention described and claimed in U.S. Pat. Application Ser. No. 584,422, filed Oct. 5, 1966, now U.S. Pat. No. 3,486,506.

The invention relates to a device adapted for implantation in the human body so as to supply electric pulses for stimulating the action of the heart and comprises an envelope which contains an alternating-current generator, the rotor of which has the form of a permanent magnet, with means provided which ensure (owing to the movement of the heart) the rotor of the generator keeps operating according to an alternating rotation movement as described in U.S. Pat. No. 3,486,506. In the known device shown and described in the aforementioned patent, the rotor is arranged between the poles of a magnet yoke, and the rotation movement of the rotor is caused by a balance which is adapted to rotate about a shaft and is connected to the wall of the envelope by a first resilient member and also to the rotor by a second resilient member. By connecting the device to the heart muscle it follows the movement of the heart muscle, and this actuates the balance, which in turn drives the rotor through the resilient member. The movement of the rotor gives rise to variations in the magnetic field strength in the magnet yoke which is provided with an electric oil in which the field strength variations produce electric pulses which are applied to the heart muscle and forms the stimulus for increasing the heart action It is an object of the present invention to amplify the amplitudes of the stimulating pulses by increasing the speed of the rotor.

According to the invention, the improvement in the device as described in the above mentioned patent consists in providing a member which is arranged for rotation about the rotor shaft and is resiliently connected to, and driven by, the balance and includes mechanical coupling elements for driving the rotor.

Further features and advantages of the invention will become apparent from the following description of the embodiments thereof, given by way of example only, in conjunction with the accompanying drawings, in which.

Figure 1:
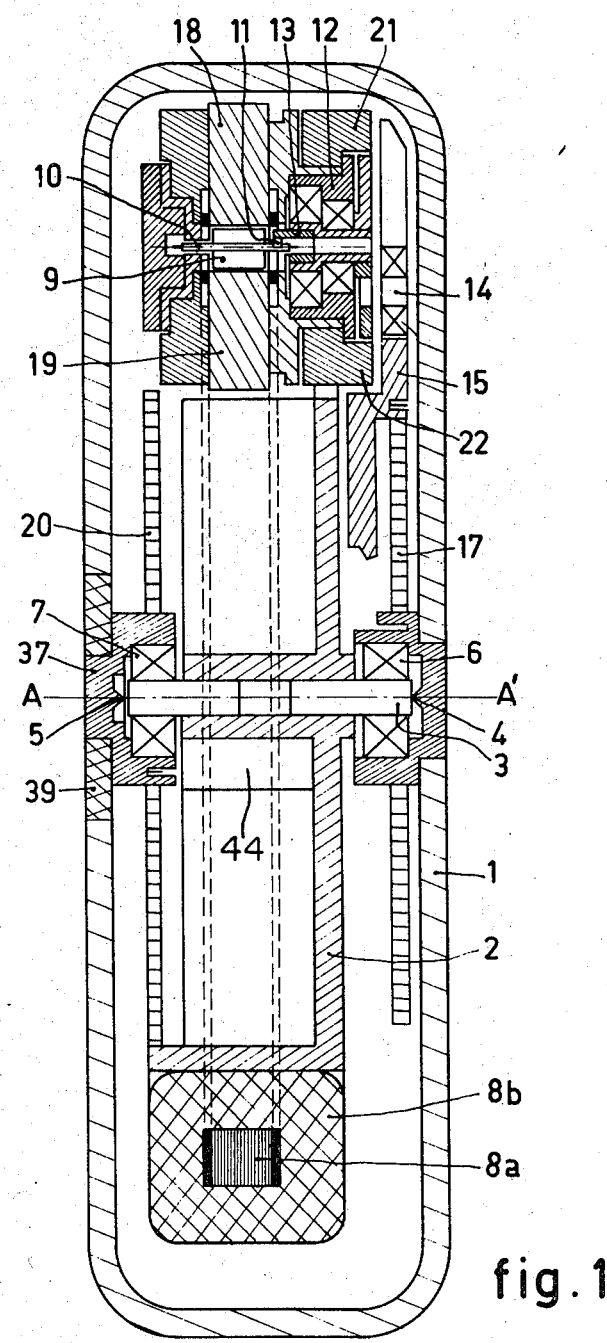
FIG. 1 is a sectional view of a device for stimulating the action of the heart, taken along the axis A-A'.

As described in U.S. Pat. No. 3,486,506, the pulse generator proper is accommodated in a hermetically closed envelope 1 which is evacuated or filled with an inert gas, and which is covered with a thin coating of a synthetic material to which the body is tolerant.

The pulse generator comprises a balance 2 which is arranged for rotation about a shaft 3 in the envelope 1. In order to avoid axial play and undesirable axial pressure, the shaft 3 is arranged between pivot points 4 and 5 and is supported by ball bearings 6 and 7. The balance 2 is surrounded along its periphery by an annular armature which comprises a magnet core 8a which may be built up of weak magnetic metal laminations and carries a winding 8b of copper wire. The rotor of the generator is in the form of a cylinder 9 which is magnetized in a direction at right angles to its shaft 10 and is accommodated in a gap in the annular armature, its axis of revolution being parallel and eccentric to the shaft 3 of the balance 2. The rotor shaft 10 has a lug 11.

A rotatable member 12 is arranged beside the rotor 9 so as to be coaxial therewith and is provided on its surface facing the rotor with a pin 13 capable of engaging the lug 11. On its opposite surface, the rotatable member 12 has a second driving pin 14. This pin 14 fits into a fork 15 hinged to the balance by a hinge pin 16 integral therewith.

The fork 15 is resiliently connected to the wall of the envelope 1 by a spiral spring 17, and on rotation of the balance this spring is tensioned alternately in one direction and the other.

The rotor is a arranged in a magnetic field, extending at right angles to the rotor shaft and produced by two permanent magnets 18 and 19.

U.S. Pat. No. 3,486,506, describes that in order to enable operation of the device, the device is arranged so that the movement of the heart results in a rotational movement of the entire device by utilizing the translation movement of the point of the heart. At each heart beat the device is given an alternating rotation movement about a fixed point, and this movement is transmitted to the balance by a spring 20. The amplitude of the balance oscillation may be made very large by ensuring that it is in resonance with the frequency of the heart beat.

In its oscillation movement the balance alternately tensions and relaxes the spiral spring 17 so that forces are exerted on the fork 15 alternately in either direction. These forces displace the fork 15 which drives the pin 14 so that the rotatable member 12 is given a rotation movement, the fork effectively acting as a connecting rod. The rotor 9 is driven by the pin 13 on the rotating member 12 which abuts the lug 11 of the rotor until the latter passes through its position of unstable equilibrium. The unstable-equilibrium position is to be understood to mean the position in which the direction of the magnetic field of the rotor is opposite to that of the magnetic field produced by the two radially arranged magnets 18 and 19. Under the influence of the repulsion of like poles the rotor is given a high speed, and after a nearly complete revolution it is stopped by the lug 11 abutting the other side of the pin 13. By the return movement of the fork 15 the rotary member 12 is driven so as to cause the rotor to pass again through its unstable-equilibrium position in the reverse sense. Thus, the rotor performs an oscillating movement the damping of which depends upon the friction but also on the eddy currents and the strength of the magnetic field.

The resulting field-strength variation produces in the armature winding 8b an electric pulse which actually has the form of a sine wave and, as will be described more fully hereinafter, is used to cause the heart muscle to contract. Hence, the heart beats in the rhythm of the balance, since the latter controls the electric stimulating pulses.

The driving of the rotor 9 by the rotary member 12 may involve a difficulty, for in its two extreme positions (not shown) the fork 15 no longer exerts a couple on the rotary member so that the latter is liable to become stuck. To eliminate this disadvantage two magnets 21 and 22 may be disposed near the rotary member 12 for preventing it from being arrested at the sticking point.

Figure 3:
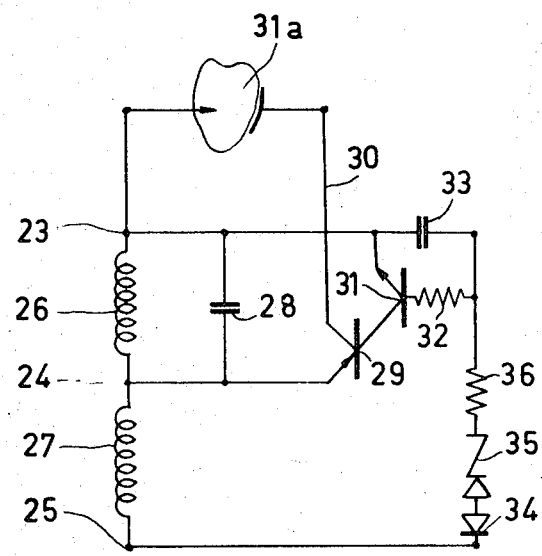
FIG. 3 is a circuit diagram of a changeover switch which is connected between the alternating current generator and the electrodes and through which the electric pulses are applied to the heart muscle.

FIG. 3 shows a circuit diagram for an electronic changeover switch which is connected to the armature winding and is provided to convert the electric pulse which is produced in the armature winding in the form of a less suitable sine wave into an undamped pulse in order to ensure maximum energy efficiency.

Figure 2:
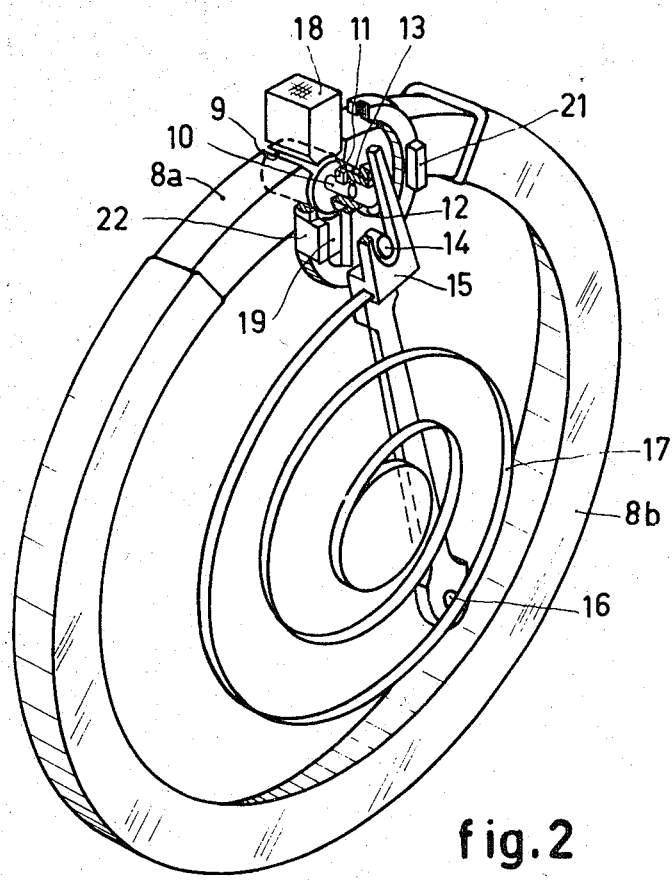
FIG. 2 shows schematically the moving parts of the device.

FIGS. 1 and 2 do not show the three output terminals of the winding 8b. In FIG. 3 these terminals are designated by 23, 24 and 25. Between the terminals 23 and 24 lies a part 26 of the winding 8b which has to supply the energy for the heart muscle. The winding part 27 between the terminals 24 and 25 through the latter terminal supplies an actuating signal for the changeover switch and hence may be made of thinner wire.

A winding 26 forms together with a capacitor 28 connected across it a resonant circuit tuned to a frequency equal to the frequency of oscillation of the rotor. The energy is alternately transferred from the rotor to the circuit and vice versa. The rotor oscillates about its stable equilibrium position with an amplitude of a half revolution, but after each oscillation this amplitude decreases to zero and the resonant circuit oscillates electrically with the largest possible amplitude. Thus, when the rotor is near its stable-equilibrium position there is an instant at which the energy stored in the resonant circuit is a maximum, but after this exactly defined instant the resonant circuit again supplies energy to the rotor so as to drive it. In order to ensure operation with the maximum energy efficiency an electronic transistorized changeover switch is used which discharges the resonant circuit into the heart muscle at the instant at which the entire energy is stored in the circuit.

The electronic switch is connected to the terminals 23 and 24 of the electric resonant circuit and includes a first transistor 29 (for example of the PNP-type) the collector 30 of which is connected to the heart muscle shown diagrammatically by 31a. The current supplied by the transistor 29 is controlled by a second transistor 31 (for example of the NPN-type) the collector of which is connected to the base of the transistor 29. The base of the transistor 31 is connected to a capacitor 33 through a resistor 32. When the capacitor 33 is not charged, the transistor 31 is not conductive; hence, the transistor 29 also is nonconductive so that no stimulus is applied to the heart muscle.

When the rotor starts moving, which is the case once in each period of the heart and of the balance, there are produced at the terminals of the windings 26 and 27 alternating voltages having frequencies equal to the frequency of the oscillation of the rotor. Through a diode 34, a zener diode 35 and a resistor 36, the terminal 25 of the winding 27 is connected to the capacitor 33 which controls the base of the transistor 31. Thus, when the terminal 25 has a negative potential with respect to the terminal 24 and this potential is sufficient to cause current to flow through the zener diode 35, the capacitor 33 is charged, and it will remain charged during the next few half periods, provided that the time constant of the circuit comprising the capacitor 33 and the resistor 32 is large enough. When the capacitor 33 has been charged, the transistors 31 and 29 are conductive and the energy stored in the resonant circuit 26—28 is discharged into the heart so as to stimulate it. The breakdown voltage of the zener diode is chosen to be not much lower than the highest voltage produced at the terminals of the winding 27 so that the electronic switch is operated at the instant at which the energy in the electric resonant circuit 26—28 is a maximum. Such a switch needs no other electric supply source than the generator winding. In an advantageous embodiment, the electronic switch is arranged in a box 44 which is accommodated in the balance; in this event the electric pulse is transmitted from the balance to the case through the shaft 3 of the balance 2 and through the spiral spring 17. If the contact made through the pivots of the balance is not considered sufficiently reliable, the electric connection to the stimulating electrodes may be established by a spiral spring 20.

Figure 4A:
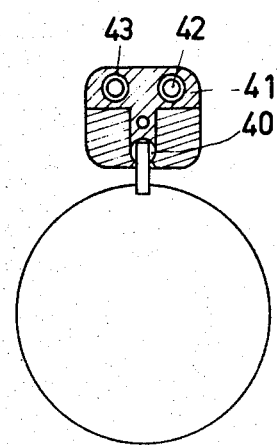
FIG. 4a is a front elevation of a device in accordance with the invention for implantation.
Figure 4B:
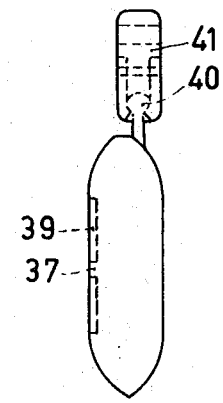
FIG. 4b is a side elevation thereof.

FIGS. 4a and 4b are front and side elevations respectively, of the device. It may be expedient for the device to be placed outside the pericardium, the heart muscle being excited through the latter.

This excitation takes place by means of a small electrode 37 (see also FIG. 1), the circuit being closed by the case 1. The electrode 37 is surrounded by an insulating plate 39 to compel the current to follow the circuit through the heart muscle. The device is secured by means of a ball-and-socket joint 40 and a flat member 41, which may be secured to the third rib by bolts at 42 and 43.

The attachment by means of a ball-and-socket joint provides the advantage that the translation movements are converted into the rotation movements required for the operation of the device. This attachment may be improved in a manner not shown by the provision of two arms or a strap encircling the heart.

I claim:

1. A device adapted for implantation in the human body for electrically stimulating the heart comprising an envelope housing, an alternating-current generator contained within said housing having a rotor mounted for rotational movement, said rotor having the form of a permanent magnet, a shaft rotatably journaled within said housing, a balance mounted for oscillatory rotational movement about said shaft, the axis of rotation of said rotor being parallel and eccentric to said shaft about which the balance oscillates, a resilient member connected between said housing and the balance, a rotatable member connected with the balance being driven thereby and arranged coaxially with said rotor, a mechanical coupling connecting said rotatable member with said rotor for driving same when said rotatable member is driven by said balance, and electrical contact means connected between said alternating-current generator and the heart muscle for supplying electrical pulses to the heart so as to stimulate the same.

2. A device as claimed in claim 1, further comprising at least one magnet being disposed near said rotor so as to produce a magnetic field at right angles to the rotor axis.

3. A device as claimed in claim 1, further comprising a connecting rod arranged between the rotatable member and the balance and a hinge pin mounted on the circumference of said balance for pivotally connecting said rod thereto.

4. A device as claimed in claim 1, wherein said mechanical coupling comprises a pin attached to said rotary member and a lug mounted on the rotor for abutting against said pin.

5. A device as claimed in claim 1, further comprising two magnets arranged so as to surround the rotary member and to influence its position in order to prevent it from sticking.

6. A device as claimed in claim 1, further comprising a generator winding, a capacitor connected across the terminals of the generator winding so that a resonant circuit is produced and an electronic changeover switch coupled to said capacitor which is operated at the instant at which the energy in the resonance circuit is a maximum.

7. A device as claimed in claim 6, wherein the switch is accommodated in the balance.